United States Patent [19]

Wozniak

[11] 4,217,604

[45] Aug. 12, 1980

[54] APPARATUS FOR DIGITALLY CONTROLLING PAL COLOR DISPLAY

[75] Inventor: Stephen G. Wozniak, San Jose, Calif.

[73] Assignee: Apple Computer, Inc., Cupertino, Calif.

[21] Appl. No.: 941,032

[22] Filed: Sep. 11, 1978

[51] Int. Cl.[2] .................... H04N 9/38

[52] U.S. Cl. .................... 358/16; 358/82; 358/183

[58] Field of Search .................... 358/16, 17, 81, 82, 358/183

[56] References Cited

U.S. PATENT DOCUMENTS

| | | | |
|---|---|---|---|
| 3,742,125 | 6/1973 | Siegel | 358/183 |
| 3,936,868 | 2/1976 | Thorpe | 358/183 |

*Primary Examiner*—Richard Murray

*Attorney, Agent, or Firm*—Blakely, Sokoloff, Taylor & Zafman

[57] ABSTRACT

An apparatus for digitally controlling the display of color in a phase alternation line (PAL) video display is disclosed. Coded digital signals are shifted in a recirculating shift register. The direction of shifting in the register and the stage at which the signals in the register are sensed are changed as a function of odd/even display lines to compensate for PAL phase reversals.

12 Claims, 6 Drawing Figures

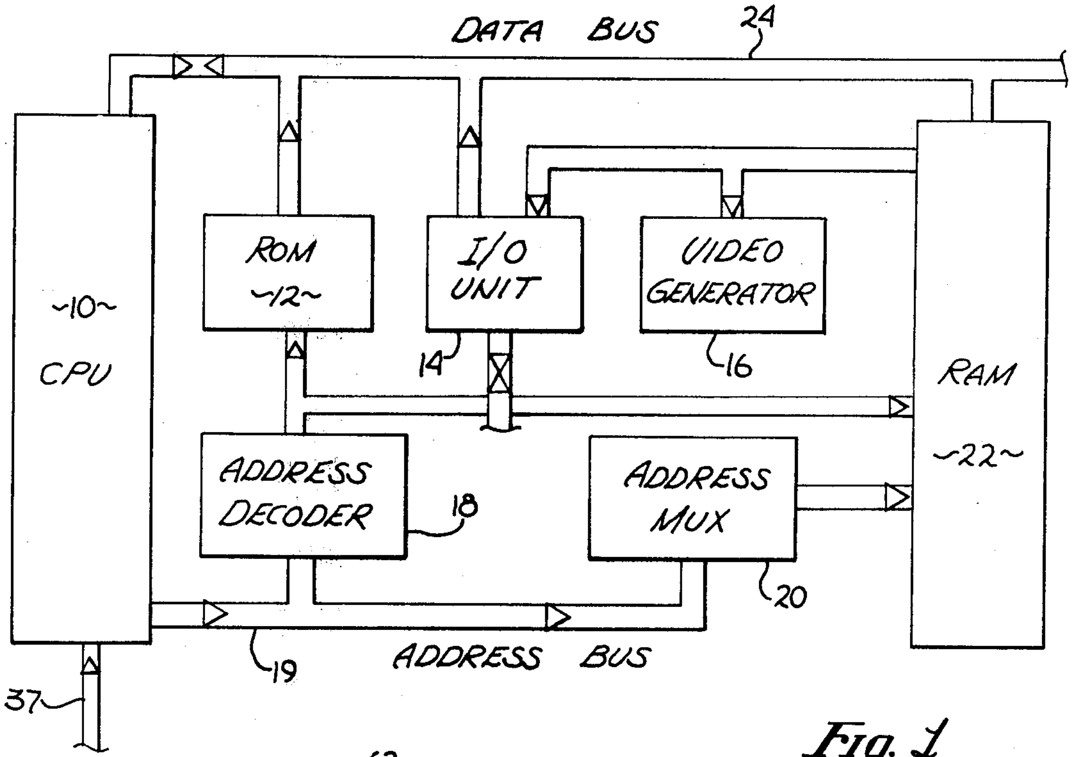
Fig. 1
Fig. 3a
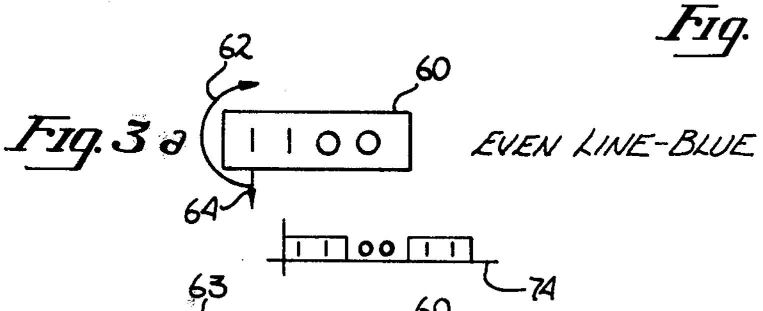
Fig. 3b
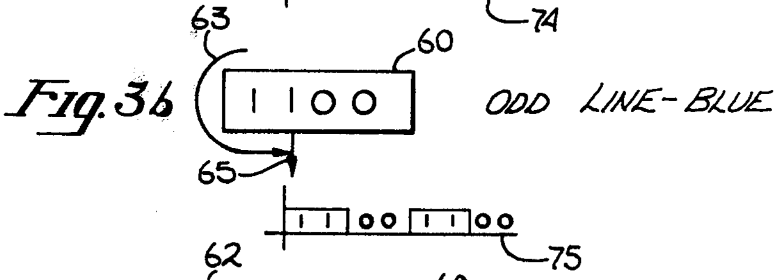
Fig. 3c
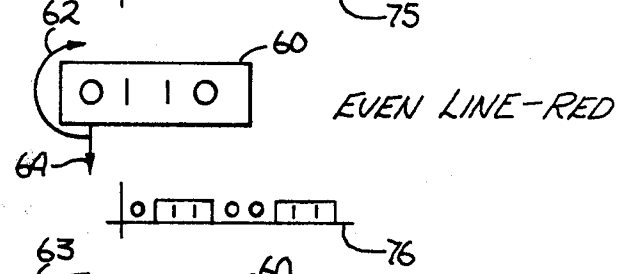
Fig. 3d
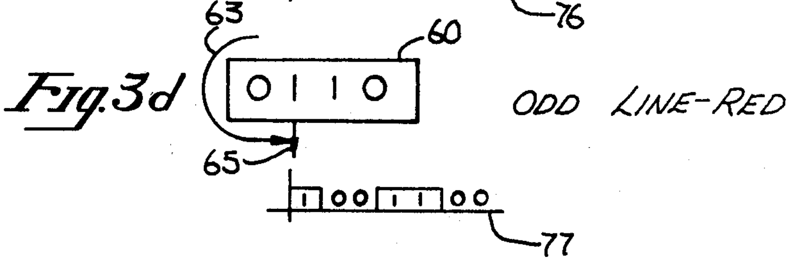

APPARATUS FOR DIGITALLY CONTROLLING PAL COLOR DISPLAY

BACKGROUND OF THE INVENTION

1. Field of the Invention

The invention relates to the field of digitally controlling video displays.

2. Prior Art

With the reduced costs of large scale integrated circuits, it has become possible to provide low cost microcomputers suitable for home use. One such use which has flourished in recent years is the application of microcomputers to video displays for games, graphic displays and the like. Most often an ordinary television receiver is employed as the video display means. The standard, raster scanned cathode ray tubes employed in these receivers present unique problems in the interconnecting of these displays with the digital information provided by the microcomputer.

These receivers are designed to operate with one or more standard video broadcasting schemes such as PAL. In copending application Ser. No. now U.S. Pat. No. 4,136,359 786,197, filed Apr. 11, 1977, entitled "Microcomputer For Use With Video Display", and assigned to the assignee of this application, a digitally controlled display is described. This earlier filed application deals in part with the generation of color signals for the television broadcasting system employed in the United States and some other countries, referred to as the National Television Systems Committee (NTSC) standard.

In many parts of the world and particularly in Europe, a phase alternation line (PAL) system is employed for television broadcasting. The PAL raster scan displays employ different signals (e.g. different frequencies, format, etc.) than the NTSC standard. The subject of this application is a unique means for generating color signals in a digital manner which are compatible with a PAL display such as an ordinary PAL compatible television receiver.

SUMMARY OF THE INVENTION

An improved color generation means for a video display is described. The color generation means is particularly useful with a digital computer which provides digital signals for controlling a raster scan display where the display is adapted for functioning with a standardized video signal such as a PAL signal. The improved color generation means includes a circuit means for providing a signal representative of the odd and even lines on the display. A recirculating shift register means is employed which is capable of selectively recirculating digital signals in both directions. Coded digital signals when read from the register means provide a video color signal since shifting in the register means occurs at a frequency compatible with the display. The register means is coupled to the circuit means such that the signal representative of the odd and even lines selects the direction of the recirculation in the register. A multiplexing means is employed to select alternate stages of the register means. In this manner compensation for the color signal phase reversals of the coded digital signals is provided.

BRIEF DESCRIPTION OF THE DRAWINGS

FIG. 1 is a general block diagram of the microcomputer which generates the digital signals used to control the video display.

FIGS. 3*a*, 3*b*, 3*c*, and 3*d* are a series of diagrams used to illustrate the effects of shifting digital signals in a register in different directions and of sensing the signals at different stages in the register. These diagrams are used to explain the operation of the color generation means of FIG. 2.

DETAILED DESCRIPTION OF THE INVENTION

Figure 2:
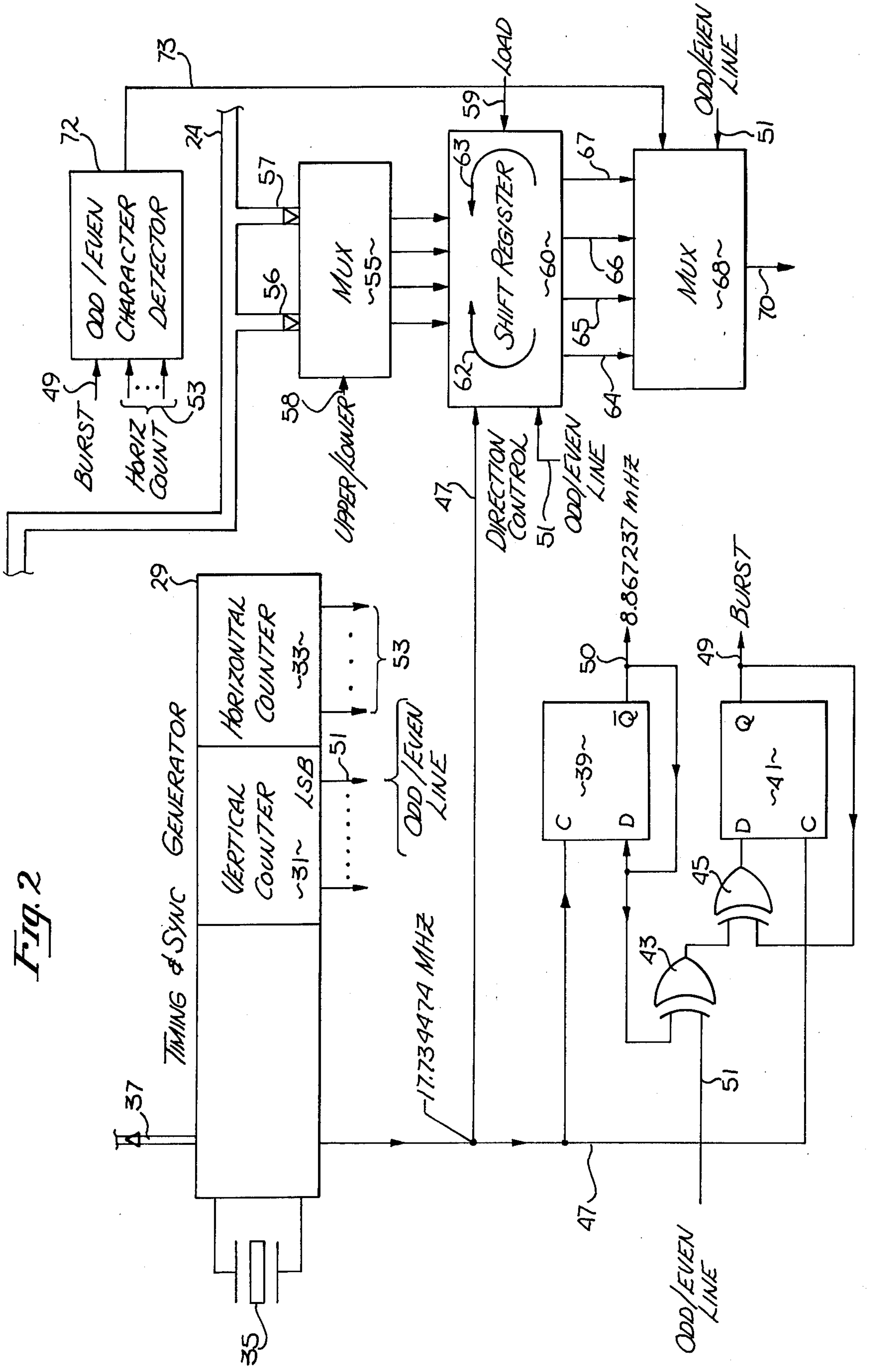
FIG. 2 is a block diagram and circuit diagram of the improved color generation means of the present invention, the circuit employed to provide a continuous "burst" signal and the timing and synchronization generator.

An improved color generation means particularly suited for use with a phase alternation line (PAL) video display such as a PAL-compatible television receiver is described. In the following description numerous specific details such as specific frequencies and number of bits are set forth to provide a thorough understanding of the present invention. However, it will be obvious to one skilled in the art that the invention may be practiced without these specific details. In other instances, well-known circuits such as logic circuits and timing circuits have not been set forth in detail in order not to obscure the present invention in unnecessary detail.

Throughout this application, reference is made to the PAL broadcasting system or standard (or PAL signal). Since numerous details associated with PAL broadcasting are well-known to one skilled in the art, they are not set forth in the present application. Numerous texts and patents describe this broadcasting system in detail. For example, see *Receiving PAL Colours Television* by A. G. Priestley, published by Fountain Press, England, 1974.

In its presently preferred embodiment, the improved color generation means of the present invention is incorporated with a microcomputer which generates a PAL compatible video signal which may be directly coupled to a standard PAL television receiver. This microcomputer which is sold under the trademark "Apple" includes many modes of operation, however, only the generation of the color video signal and its related circuitry are part of the present invention. Thus, many aspects of this microcomputer are not discussed in the present application. It will be apparent to one skilled in the art that anyone of a plurality of other commercially available microcomputers may be used with the invented color generation means.

In FIG. 1 the microcomputer includes a microprocessor or central processing unit (CPU) 10. In the presently preferred embodiment, a commercially available microprocessor Part Number 6502, is used. The CPU 10 communicates through bidirectional tristate buffers (not illustrated) with a data bus 24. The microcomputer includes two memories; one memory is a 12 K (bytes) read-only memory (ROM) 12 which is coupled to the data bus 24. This memory is used for program storage. The second memory is used for general storage for the microcomputer and comprises the random-access memory 22. This memory, in the commercial embodiments of the microcomputer, contains between 4 K to 48 K (bytes) and consists of commercially available dynamic MOS memories.

The address decoder 18 receives address signals from the address bus 19 and decodes them in a well-known manner. The address decoder 18 is coupled to the ROM 12 and RAM 22. Address signals on the bus 19 are also coupled to the address multiplexer 20. This multiplexer couples address signals to the RAM 22.

The input/output (interface) unit 14 provides ports which allow the microcomputer to be electrically coupled to a cassette jack, floppy disc or to other electrical means. Known buffers and timing means are employed for this purpose.

The video generator 16 receives signals from the input/output means 14 and also from the RAM 22. This generator provides video signals for the display. A portion of this generator particularly that portion which generates the PAL-compatible color signal is discussed in detail in conjunction with FIG. 2.

In FIG. 2 a timing and synchronization generator 29 is illustrated which provides the timing signals for the computer on lines 37 and for a display coupled to the microcomputer. Ordinary timing means may be employed for the generator 29. A crystal 35 is used to provide the basic timing for the timing and synchronization generator 29. Among the frequencies provided by means 29 is the 17.734474 MHz timing frequency on line 47. This signal is used to generate a continuous "burst" signal on line 49, as will be discussed. This frequency is also used by the shift register 60.

A digital counter 33 which is part of the timing and synchronization generator 29 provides a digital count representative of horizontal beam location. The digital output of the counter 33, lines 53, are coupled to the odd/even character detector 72 in addition to other means within the computer. In the presently preferred embodiment, the 17.734474 MHz signal is divided first by 18 and then by 63 to provide a timing signal to drive the counter 33. This counter resets at a count of 1134, one count less than the standard PAL line count. The resetting of the counter 33 advances the digital counter 31. The digital counter 31 which provides a digital signal representation of a vertical beam location in the presently preferred embodiment, is reset at an even number, specifically 312. The least significant bit of this counter, which is coupled to line 51, provides an odd-/even line signal. That is, when a binary zero is present on line 51, an even numbered line is being scanned, whereas when a binary one is present on line 51, an odd numbered line is being scanned.

In FIG. 2 the circuit comprising the bistable circuits, flip-flops 39 and 41 and the exclusive OR gates 43 and 45 are used to generate a timing signal of 8.867237 MHz on line 50 and also a continuous "burst" signal on line 49. The signal on line 49 is a 4.43361875 MHz signal with phase alterations of $\pm 45°$ for odd/even lines.

The timing signal on line 47 from generator 29 is coupled to the C terminals of the flip-flops 39 and 41. The $\overline{Q}$ output terminal of the flip-flop 39 (line 50) is coupled to the D terminal of this flip-flop and also to one input terminal of the gate 43. The other input terminal of gate 43 receives the odd/even line signal on line 51. The output of the gate 43 is coupled to one input terminal of the exclusive OR gate 45. The other input terminal to this gate is coupled to line 49. The output of the gate 45 is coupled to the D terminal of the flip-flop 41. An examination of the logic associated with these flip-flops and gates will reveal that the burst signal on line 49 is in fact a signal having a frequency $\frac{1}{4}$ that of the signal on line 47 with a $\pm 45°$ phase shift for odd/even lines.

As presently implemented, an odd number of characters, each of equal width, are displayable on the display in the horizontal direction. However, the width of each of these characters is not an integer number of color reference frequency cycles. For this reason, compensation from character-to-character for the video color signal (line 70) must be provided. A signal is developed on line 73 by the odd/even character detector 72 for this purpose. This detector receives the continuous "burst" signal (line 47) and also the horizontal line count (lines 53). At the beginning of each character as determined by the horizontal count (this is also the time at which color data is loaded into the shift register 60 from the multiplexer 55) the "burst" signal is examined. If the signal is in its high state or low state a signal of a first binary state is coupled to line 73. If the signal is in a transition, a signal of the second binary state is coupled to line 73. Obviously, ordinary logic means may be employed to implement the odd/even character detector 72.

The video color signal is primarily generated within the shift register 60 and is coupled to the line 70 through the multiplexer 68. In the presently preferred embodiment, a four bit shift register is employed. However, the principles described herein are applicable to a shift register with more than four stages. The shift register is of the recirculating type, thus it continually circulates the data which is shifted into the register in parallel form from the multiplexer 55. This data is shifted at the rate of 17.734474 MHz which signal frequency is coupled to register 60 via line 47. The register 60 is capable of shifting the data in two directions as indicated by directions 62 and 63. The direction control is determined by the odd/even line signal coupled to the register 60 on line 51. Also a load signal is coupled to the register 60 on line 59. As mentioned, loading occurs at the beginning of each character for the presently preferred embodiment, however, loading may occur at other times.

As presently implemented in the microcomputer, four lines 57 of the eight lines of the data bus 24 are employed to provide color data for the upper portion of each character, while four lines 56 of the data bus 24 are employed to provide color data for the lower portion of each character. The multiplexer 55 thus selects either the lines 56 and 57 and couples these lines to the register 60. The microcomputer generates a signal indicating whether the upper portion or lower portion of the character is being written and furnishes an appropriate signal to the multiplexer 55 on line 58. However, this particular coupling for obtaining the color data is not critical to the present invention.

Each stage of the register 60 is coupled to the multiplexer 68 so as to permit sensing of the data at any stage of the register as the data is recirculated. Thus the multiplexer permits selective coupling of one of the lines 64, 65, 66 or 67 to line 70. The particular tap or stage of the register which is selected is a function of the binary signals coupled to the multiplexer 68 on lines 51 and 73.

The operation of the improved color generation means shall first be described without the additional compensation required from character-to-character as provided by the signal on line 73. Referring to FIG. 3a, assume that the binary coded signal 1100 represents the color blue and that the this code is shifted into the shift register 60 from the multiplexer 55 (FIG. 2). Furthermore assume that an even line is being scanned and that the direction of circulation within the register 60 is shown by direction 62. For these conditions also assume that the first stage of the register is selected by the multiplexer 68 as indicated by line 64. The resultant signal on line 64 which is coupled to line 70 through the multiplexer is shown by the graph 74. This video signal provides a pure blue color on the display. When an odd line is being scanned, the video signal for blue does not shift in phase for standard PAL broadcasting. However, when an odd line is scanned the direction of recirculation within the register 60 as shown in FIG. 3*b* changes and as indicated by direction 63. For an odd line the second stage of the register 60 is selected (line 65). The selection of this stage is controlled by the signal coupled to the multiplexer 68 via line 51 (FIG. 2). The signal sensed on line 65 is shown by the graph 75. As may be seen this signal is identical with that shown in FIG. 3*a*. Thus even though the direction of recirculation has changed within the register, because of the different stage selection, the same signal results. This, of course, is the desired result since there is no difference in the blue color video signal from line-to-line Referring now to FIG. 3*c*, assume that the binary code for a pure red signal is 0110, and that the digital signal for this color is shifted into the register 60. If an even line is scanned, again the digital signal is recirculated in direction 62 and the signal is sensed on line 64. This results in the signal shown in graph 76. As shown in FIG. 3*d*, for an odd line the signal 0110 is shifted in direction 63 and sensed on line 65. The resultant signal is shown on graph 77. Note that there is a 180° phase reversal between the signals of FIGS. 3*c* and 3*d* for the odd and even lines. This phase reversal corresponds to the red signal phase reversals implemented in PAL broadcasting.

While only a pure blue and pure red case have been illustrated above, appropriate video color signals are generated by register 60 for all possible colors obtainable with the four bit color signals employed in the preferred embodiment. Moreover, color coded signals with greater number bits (e.g. 8 bits) may be employed with larger shift registers (e.g. 8 stages) with the same result.

With the additional signal provided on line 73 (FIG. 2) the multiplexer 68 selects one of the lines 64, 65, 66 and 67 as a function of the signals on lines 51 and 73. Specifically, line 64 is selected for an odd character, even line; line 65 for an odd character, odd line; line 66 for an even character, even line, and; line 67 for an even character, odd line. This selection of lines provides the additional required character-to-character compensation.

Thus, by changing the direction of shifting in the register 60 as a function of even lines and odd lines and also by appropriately selecting different stages of the register, compensation is provided for the color signal phase reversals implemented in PAL broadcasting.

I claim:

1. In an apparatus for use with a phase alternation line video display adapted to receive color signals having a color subcarrier reference signal of frequency N, an improved color signal generation means comprising:

means for generating at least one digital word which corresponds to a predetermined color, said digital word comprising a plurality of bits;

storing means for storing said digital word;

circuit means for providing an odd/even signal representative of odd and even lines on said display;

sampling means coupled to said storing means for sequentially sampling each of said bits of said digital words at a predetermined sampling rate in a first sequence and a second sequence opposite to said first sequence, said first and second sequences being selected according to said odd-even signal and said predetermined sampling rate being selected such that a color signal is developed at an output of said sampling means which corresponds to said predetermined color and which has a frequency component at said frequency N;

whereby a color signal suitable for use with a phase alternation line video display is generated.

2. The color signal generation means of claim 1 wherein said sampling means includes bit selecting means for controlling which of said bits is sampled in the beginning of said first and second sampling sequences.

3. The color signal generation means of claim 2 wherein said sampling means is a recirculating shift register means having a plurality of stages for receiving said digital word from said storing means and for circulating said digital word at said predetermined sampling rate in a first direction which corresponds to said first sampling sequence, and a second direction which corresponds to said second sampling sequence.

4. The color signal generation of claim 3 wherein said bit selecting means comprises a multiplexing means for selectively coupling one of said stages of said shift register means to said output.

5. The color signal generation means of claim 4 wherein said selective coupling of said multiplexing means occurs in response to said odd-even signal.

6. The color signal generation means of claim 5 wherein said shift register means is comprised of P number of said stages and said predetermined sampling rate is at a frequency approximately equal to N×P.

7. The color signal generation means of claim 6 wherein said circuit means comprises a digital counter and said odd/even signal is derived from the least significant bit of said counter.

8. The color signal generation means defined by claim 6 wherein P is equal to four.

9. The color signal generation means of claim 8, wherein N is approximately 4.434 MHz and said predetermined sampling rate is approximately 17.734 MHz.

10. The color signal generation means of claim 9 wherein said at least one digital word and said corresponding predetermined color comprise the following:

| Digital word | Corresponding Color |
|---|---|
| 1100 | Blue |
| 0110 | Red |

11. In an apparatus for use with a phase alternation line video display adapted to receive color signals having a color subcarrier reference signal of frequency N and where said apparatus provides a predetermined number of characters at least in the horizontal direction on said display, an improved color signal generation means comprising:

means for generating at least one digital word which corresponds to a predetermined color, said digital word comprising P number of bits;

storing means for storing said digital word;

first circuit means for providing an odd/even line signal representative of odd and even lines on said display;

second circuit means for providing an odd/even character signal representative of odd and even characters on said display;

sampling means coupled to said storing means for sequentially sampling each of said bits of said digital word at a sampling rate approximately equal to N×P in a first sequence and in a second sequence opposite to said first sequence, said first and second sequences being selected according to said odd-/even signal, with said sampling means further including a bit selecting means responsive to said odd/even line signal and said odd/even character signal for controlling which of said bits is sampled in the beginning of said first and second sampling sequences;

whereby a color signal suitable for use with a phase alternation line video display is generated at an output of said sampling means.

12. The color signal generation means of claim 11 wherein said sampling means comprises a recirculating shifter register means having P number of stages for receiving said digital word from said storing means and for circulating said digital word at said predetermined sampling rate in a first direction which corresponds to said first sampling sequence and a second direction which corresponds to said second sampling sequence and wherein said bit selecting means comprises a multiplexer having a plurality of inputs coupled to said stages of said shift register means and a multiplexer output coupled to said sampling means output.

* * * * *